(12) United States Patent
Suzuki et al.

(10) Patent No.: US 10,611,276 B2
(45) Date of Patent: Apr. 7, 2020

(54) SEAT COVER, SEAT COVER MANUFACTURING METHOD, AND VEHICLE SEAT

(71) Applicant: TACHI-S CO., LTD., Tokyo (JP)

(72) Inventors: Takahiko Suzuki, Tokyo (JP); Koji Kobayashi, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 20 days.

(21) Appl. No.: 16/072,967

(22) PCT Filed: Oct. 31, 2016

(86) PCT No.: PCT/JP2016/082331
§ 371 (c)(1),
(2) Date: Jul. 26, 2018

(87) PCT Pub. No.: WO2017/138195
PCT Pub. Date: Aug. 17, 2017

(65) Prior Publication Data
US 2019/0031062 A1 Jan. 31, 2019

(30) Foreign Application Priority Data
Feb. 9, 2016 (JP) .................................. 2016-023012

(51) Int. Cl.
*B60N 2/60* (2006.01)
*B60N 2/58* (2006.01)
*B68G 7/052* (2006.01)

(52) U.S. Cl.
CPC ......... *B60N 2/5883* (2013.01); *B60N 2/5833* (2013.01); *B60N 2/5891* (2013.01);
(Continued)

(58) Field of Classification Search
CPC .. B60N 2/5883; B60N 2/5833; B60N 2/5891; B60N 2/609; B60N 2/6036; B68G 7/052
(Continued)

(56) References Cited

U.S. PATENT DOCUMENTS 3,940,812 A * 3/1976 DiForti .................... A43B 9/00
112/418
5,899,528 A * 5/1999 Rumpf ................. B29C 59/007
280/730.2
(Continued)

FOREIGN PATENT DOCUMENTS

| JP | S61-079964 U | 5/1986 |
| JP | 2002-191877 A | 7/2002 |
| JP | 2014-213003 A | 11/2014 |

OTHER PUBLICATIONS

Jan. 24, 2017, International Search Report issued for related PCT Application No. PCT/JP2016/082331.
(Continued)

*Primary Examiner* — Syed A Islam
(74) *Attorney, Agent, or Firm* — Paratus Law Group, PLLC

(57) ABSTRACT

A seat cover (5) of a vehicle seat (1) includes: a welt seam part (17) in which seam allowances (15 and 16) of sewn skin materials (10 and 11) are split to right and left sides to be folded on the skin materials (10 and 11), and are sewn on the skin materials (10 and 11) by stitches (13 and 14) which are formed in the skin materials (10 and 11) along a seam (12) where the skin materials (10 and 11) are sewn; and a hook-and-loop fastener (18) provided in the welt seam part (17). The seam allowances (15 and 16) include edge portions (21 and 22) arranged outside the stitches (13 and 14). The hook-and-loop fastener (18) is fixed in the edge portions (21 and 22).

6 Claims, 13 Drawing Sheets

(52) U.S. Cl.
CPC .............. *B68G 7/052* (2013.01); *B60N 2/609* (2013.01); *B60N 2/6036* (2013.01)

(58) Field of Classification Search
USPC .................................................. 297/452.62
See application file for complete search history.

(56) References Cited

U.S. PATENT DOCUMENTS

| | | | | |
|---|---|---|---|---|
| 6,443,525 | B1 * | 9/2002 | Haupt .................. | B60N 2/5833 |
| | | | | 297/452.59 |
| 6,588,838 | B1 * | 7/2003 | Dick, Jr. .............. | B60N 2/5825 |
| | | | | 297/216.13 |
| 7,278,363 | B2 * | 10/2007 | Wieczorek ........... | B60N 2/5883 |
| | | | | 112/139 |
| 7,290,793 | B2 * | 11/2007 | Tracht .................. | B60R 21/207 |
| | | | | 280/728.3 |
| 7,325,825 | B2 * | 2/2008 | Tracht .................. | B60R 21/207 |
| | | | | 280/730.2 |
| 7,380,812 | B2 * | 6/2008 | Tracht .................. | B60R 21/207 |
| | | | | 280/728.3 |
| 9,216,702 | B1 * | 12/2015 | Mannor .............. | B60R 13/0206 |
| 10,259,386 | B2 * | 4/2019 | Unger .................... | B60Q 3/233 |
| 10,414,306 | B2 * | 9/2019 | Kumagai ............. | B60N 2/5883 |
| 2011/0030596 | A1 | 2/2011 | Boinais et al. | |
| 2013/0077338 | A1 * | 3/2013 | Wenzel .................. | G02B 6/001 |
| | | | | 362/551 |
| 2017/0151897 | A1 * | 6/2017 | Nishikido ................ | B60N 2/58 |

OTHER PUBLICATIONS

Jan. 24, 2017, International Search Opinion issued for related PCT Application No. PCT/JP2016/082331.

* cited by examiner

SEAT COVER, SEAT COVER MANUFACTURING METHOD, AND VEHICLE SEAT

CROSS REFERENCE TO PRIOR APPLICATION

This application is a National Stage Patent Application of PCT International Patent Application No. PCT/JP2016/082331 (filed on Oct. 31, 2016) under 35 U.S.C. § 371, which claims priority to Japanese Patent Application No. 2016-023012 (filed on Feb. 9, 2016), which are all hereby incorporated by reference in their entirety.

TECHNICAL FIELD

The present invention relates to a seat cover, a manufacturing method of a seat cover, and a vehicle seat.

BACKGROUND ART

Generally, a vehicle seat includes a cushion pad and a seat cover which covers the cushion pad. The seat cover is formed by sewing a plurality of skin materials. Further, in some cases, a stitch is formed in the seat cover along a seam where two sheets of skin materials are sewn so as to improve the design of the seat.

In the seat cover described in Patent Document 1, the stitch is formed in each of two sheets of skin materials along the seam where the two sheets of skin materials are sewn. In addition, the seam allowances of the two sheets of skin materials are split to right and left sides to be folded on the two sheets of skin materials, respectively. The seam allowances are sewn on the skin materials by the stitches.

Further, in the seat cover described in Patent Document 1, a hook-and-loop fastener is provided in a welt seam part in which the seam allowances of two sheets of skin materials are respectively sewn on the two sheets of skin materials. The hook-and-loop fastener of the seat cover is coupled with a hook-and-loop fastener provided in the cushion pad, so as to improve a fitting property of the seat cover with respect to the cushion pad.

RELATED ART REFERENCE

Patent Document

Patent Document 1: JP-A-2002-191877

SUMMARY OF THE INVENTION

Problems to be Solved by the Invention

A pulse motor is generally used to drive a needle of a sewing machine and to feed a fabric. For example, in a case where the speed of the motor is drastically changed by the driving and stopping of the sewing machine, the motor may be stepped out, and the motion of the needle may be disturbed. Since there is a demand of preventing the disorder of the stitch appearing in the appearance of the seat, the stitch is typically formed at once without stopping on the way.

In the seat cover described in Patent Document 1, when the seam allowances of two sheets of skin materials are respectively sewn on the two sheets of skin materials by the stitches, the hook-and-loop fastener is also sewn on the two sheets of skin materials by the stitches integrally with the seam allowances.

According to the above sewing process, it is demanded that the stitch is formed at once in a state where the seam allowances, which are folded on two sheets of skin materials, of the two sheets of skin materials are pressed, and further the hook-and-loop fastener overlapped with the seam allowances is pressed. Thus, it is extremely difficult to form a stitch. When the seam allowance is pressed insufficiently, the position of the seam allowance may be deviated so that shrinkage or a wrinkle occurs in the skin material. Also, when the hook-and-loop fastener is pressed insufficiently, similarly, the shrinkage or the wrinkle may occur in the skin material, which is concern.

The invention has been made in consideration of the above situation, and an object thereof is to facilitate, in a seat cover formed by sewing a plurality of skin materials, the forming of a stitch which sews seam allowances of two sheets of sewn skin materials on the skin materials in a folded-back state, and the fixing of a hook-and-loop fastener to a welt seam part formed by sewing the seam allowance on the skin material.

Means for Solving the Problems

According to an aspect of the invention, a seat cover which is formed by sewing a plurality of skin materials includes: a welt seam part in which seam allowances of two sheets of sewn skin materials are split to right and left sides to be folded on the two sheets of respective skin materials, and are sewn on the two sheets of respective skin materials by two strips of stitches respectively formed in the two sheets of skin materials along a seam where the two sheets of skin materials are sewn; and a hook-and-loop fastener provided in the welt seam part. The seam allowances of the two sheets of skin materials include edge portions arranged outside the two strips of stitches, and the hook-and-loop fastener is fixed in the edge portions.

According to an aspect of the invention, a manufacturing method of a seat cover which is formed by sewing a plurality of skin materials includes: splitting seam allowances of two sheets of sewn skin materials to right and left sides to be folded on two sheets of respective skin materials; forming stitches in the two sheets of respective skin materials along a seam where the two sheets of skin materials are sewn so as to sew the seam allowances of the two sheets of skin materials on two sheets of respective skin materials by two strips of the stitches formed in the two sheets of respective skin materials, thereby forming a welt seam part; and overlapping a hook-and-loop fastener with the welt seam part and fixing the hook-and-loop fastener to edge portions which are arranged outside the two strips of stitches in the seam allowances of the two sheets of skin materials.

According to an aspect of the invention, a vehicle seat includes: the seat cover; and a cushion pad covered with the seat cover. A hook-and-loop fastener is provided in the cushion pad, and the hook-and-loop fasteners of the seat cover and the cushion pad are coupled with each other.

Advantages of the Invention

According to the invention, in the seat cover formed by sewing the plurality of skin materials, it is possible to facilitate the forming of the stitch which sews the seam allowances of two sheets of sewn skin materials on the skin materials in the folded-back state, and the fixing of the hook-and-loop fastener to the welt seam part formed by sewing the seam allowance on the skin material, whereby it is possible to improve the appearance quality of the vehicle seat covered with the seat cover.

MODES FOR CARRYING OUT THE INVENTION

Figure 1:
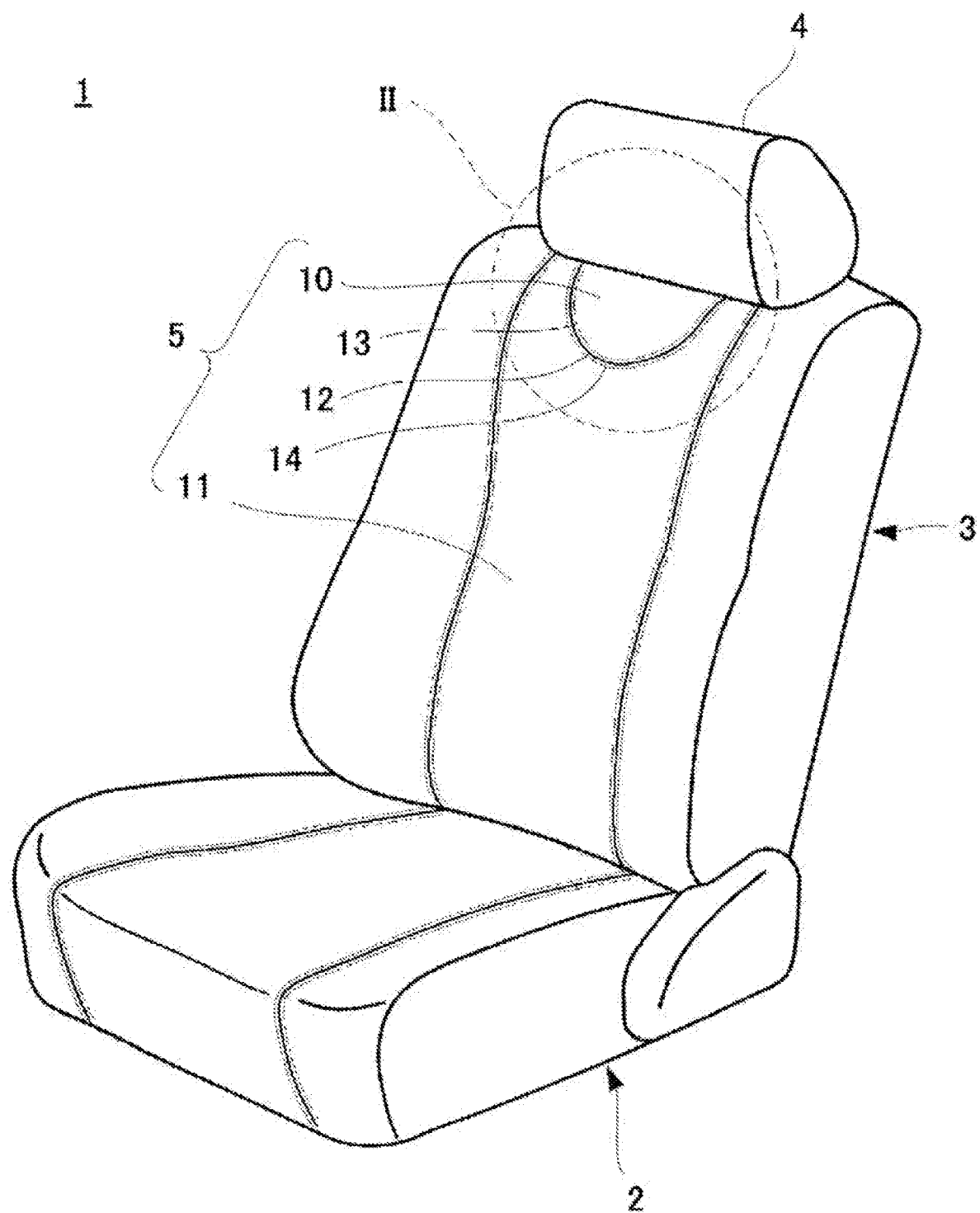
FIG. 1 is a perspective view illustrating one example of a seat cover and a vehicle seat for describing an embodiment of the invention.

FIG. 1 illustrates a configuration of one example of a vehicle seat for describing an embodiment of the invention.

A vehicle seat 1 illustrated in FIG. 1 includes a seat cushion 2 which configures a seat surface portion, a seat back 3 which configures a backrest portion, and a headrest 4 which supports a head of an occupant sitting on the seat.

The seat cushion 2, the seat back 3, and the headrest 4 each have a cushion pad which is formed of a foam material such as a polyurethane foam and a frame which supports the cushion pad. Further, the cushion pad of the seat cushion 2 and the cushion pad of the seat back 3 are integrally covered with the seat cover 5, and the headrest 4 is also covered with a seat cover separately from the seat cover 5.

Incidentally, the cushion pad of the seat cushion 2 and the cushion pad of the seat back 3 may be covered with the separate seat covers. Further, in a case where the headrest 4 is a fixed-type headrest and is configured to be integrated with the seat back 3, the cushion pad of the headrest 4 may be covered with one seat cover to be integrated with the cushion pad of the seat back 3 or to be integrated with the cushion pad of the seat cushion 2 and the cushion pad of the seat back 3.

The seat cover 5 is formed by sewing a plurality of skin materials in a bag shape. For example, a leather (a natural or a synthetic leather) or a fabric (a textile fabric, a knitted fabric, or a non-woven cloth) are used as a skin material. The skin material may have a monolayer structure of a leather or a fabric. A leather or a fabric as a front fabric may have a multilayer structure in which a wadding (for example, a resin foam such as an elastically deformable flexible polyurethane foam) is stacked on the leather or the fabric.

Figure 2:
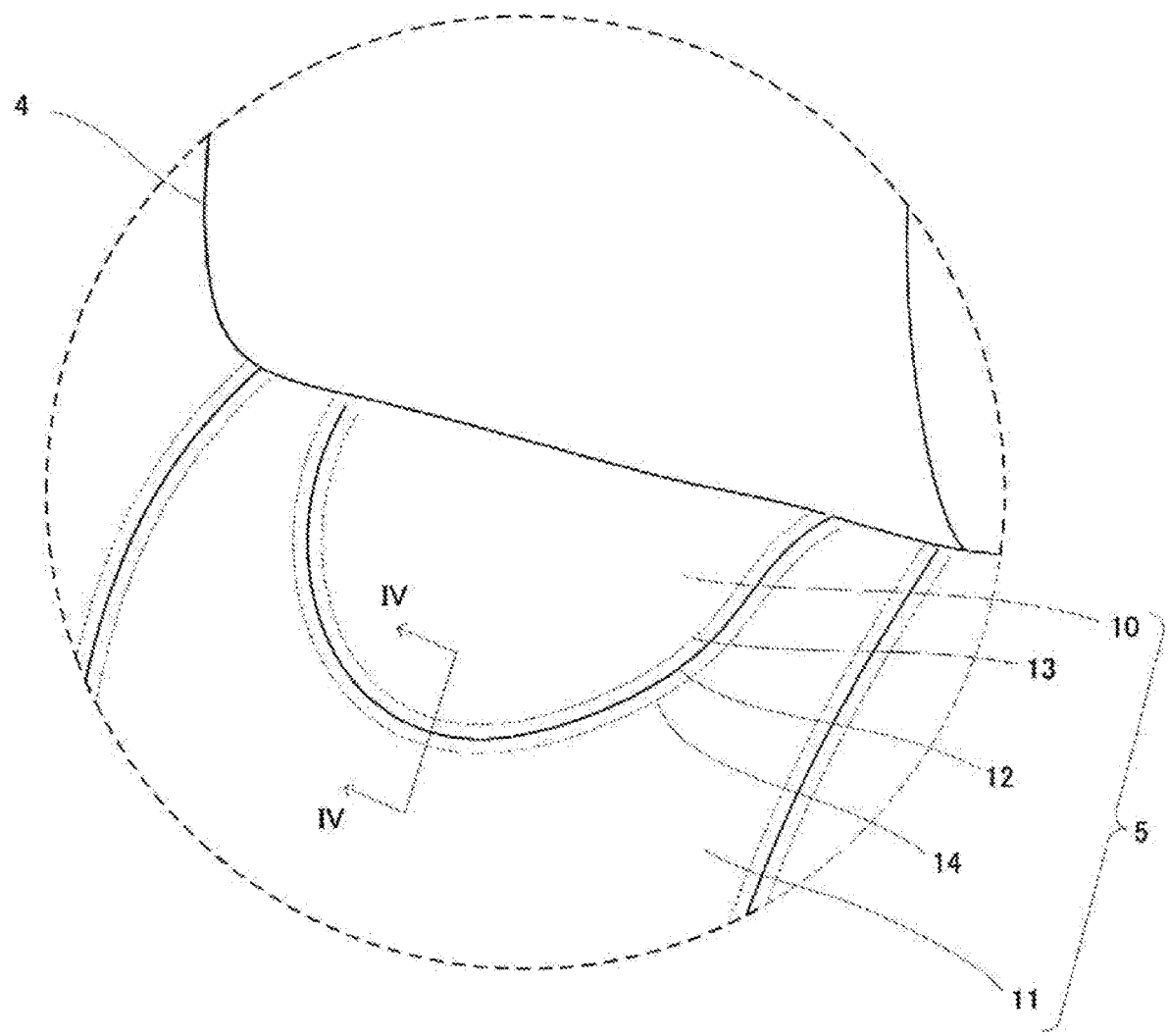
FIG. 2 is an enlarged view illustrating a portion, which is surrounded by a dashed-line circle II, of the vehicle seat of FIG. 1.
Figure 3:
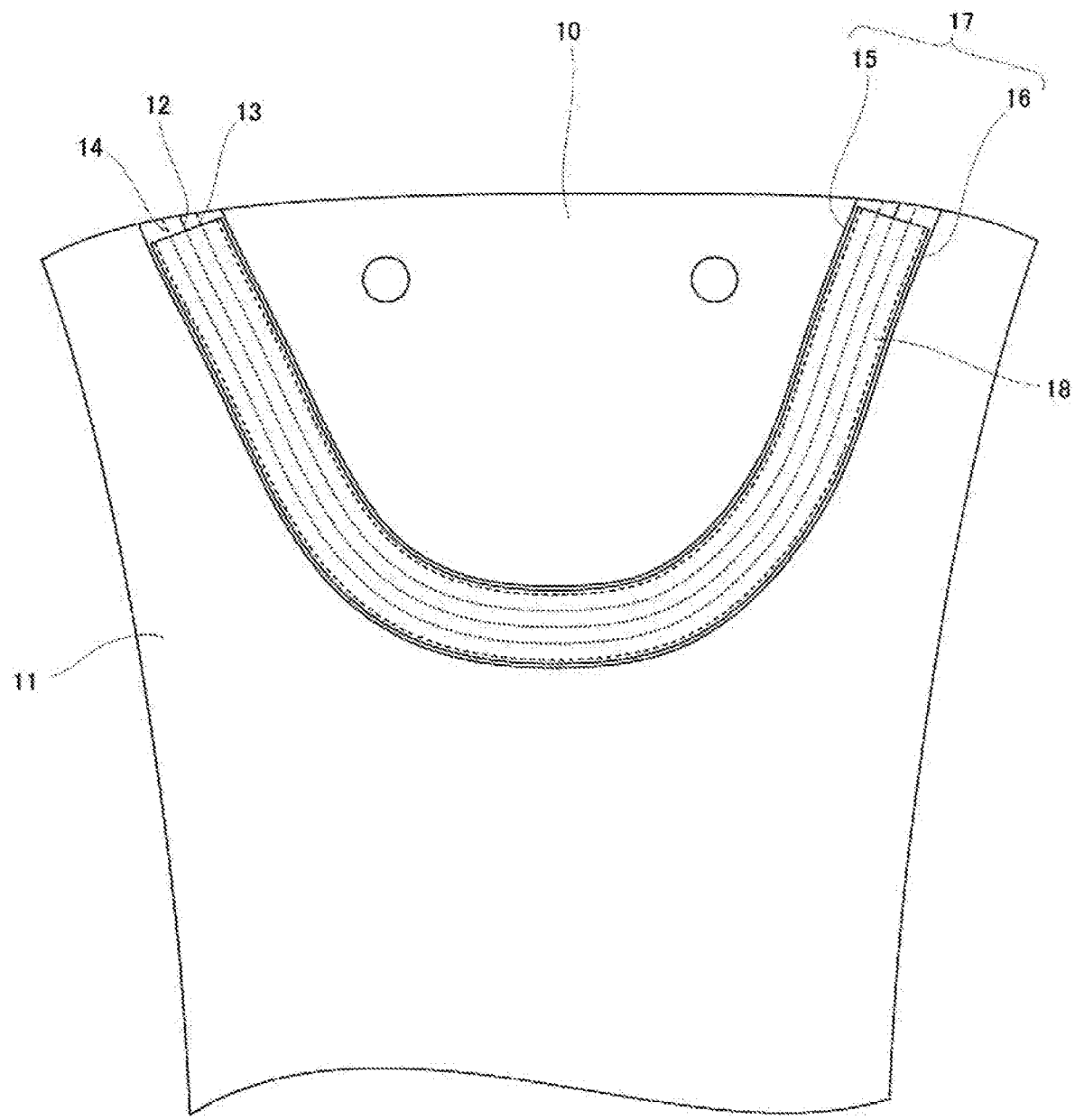
FIG. 3 is an enlarged view illustrating a back surface side of the portion, which is surrounded by the dashed-line circle II, of the seat cover of FIG. 1.
Figure 4:
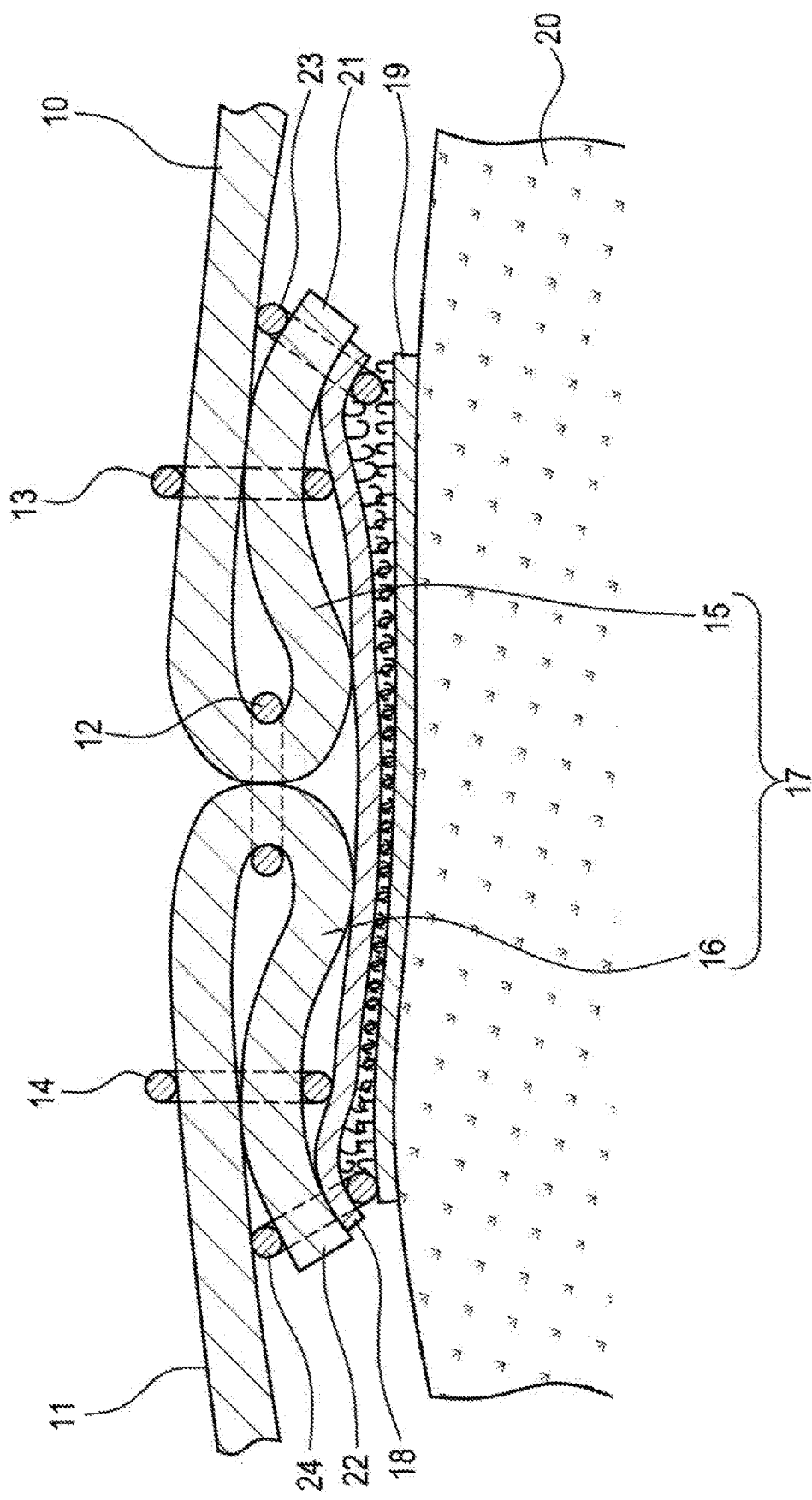
FIG. 4 is a sectional view taken along line IV-IV of the vehicle seat of FIG. 1.

FIGS. 2 to 4 illustrate the configurations of the main parts of the seat back 3 and the seat cover 5.

Among the plurality of skin materials forming the seat cover 5, two sheets of a skin material 10 and a skin material 11 illustrated in FIG. 2 cover a center support portion of a substantially widthwise central portion of the seat back 3. The center support portion of the seat back 3 is dented with respect to the side support portions of both widthwise side portions of the seat back 3 and is formed in a recess portion in the seat back 3.

The skin material 10 and the skin material 11 are sewn to each other, and a seam 12 which sews the skin material 10 and the skin material 11 is formed to be curved in a bow shape. Further, a stitch 13 which extends along the seam 12 over the entire length of the seam 12 is formed in the skin material 10, and a stitch 14 which extends along the seam 12 over the entire length of the seam 12 is also formed in the skin material 11.

A seam allowance 15 of the skin material 10 and a seam allowance 16 of the skin material 11 are split to right and left sides with the seam 12 as a boundary in the back surface side of the seat cover 5. The seam allowance 15 of the skin material 10 is folded on the skin material 10, and the seam allowance 16 of the skin material 11 is folded on the skin material 11.

The seam allowance 15 folded on the skin material 10 is sewn on the skin material 10 by the stitch 13 formed in the skin material 10, and the seam allowance 16 folded on the skin material 11 is sewn on the skin material 11 by the stitch 14 formed in the skin material 11.

In addition, a hook-and-loop fastener 18 is provided in a welt seam part 17 formed by the seam allowance 15 sewn on the skin material 10 and the seam allowance 16 sewn on the skin material 11. In this example, the hook-and-loop fastener 18 is provided over the entire length of the welt seam part 17.

As illustrated in FIG. 4, a hook-and-loop fastener 19 couplable with the hook-and-loop fastener 18 is provided in a cushion pad 20 of the seat back 3. The hook-and-loop fastener 19 is provided in the center support portion of the cushion pad 20 which is covered with the skin material 10 and the skin material 11 to be fixed in the cushion pad 20 through a sticking material, an adhesive, or the like.

When the hook-and-loop fastener 18 and the hook-and-loop fastener 19 are coupled with each other, the skin material 10 and the skin material 11 are fitted in the surface of the cushion pad 20. Particularly, the center support portion of the seat back 3 covered with the skin material 10 and the skin material 11 is formed as a recess portion in the seat back 3. The tension applied to the seat cover 5 acts on the skin material 10 and the skin material 11 to float from the surface of the cushion pad 20, but the hook-and-loop fastener 18 and the hook-and-loop fastener 19 are coupled with each other, so as to prevent that the skin material 10 and the skin material 11 float from the surface of the cushion pad 20.

As described above, the welt seam part 17 provided with the hook-and-loop fastener 18 is formed by the seam allowance 15 sewn on the skin material 10 by the stitch 13 and the seam allowance 16 sewn on the skin material 11 by the stitch 14. An edge portion 21 arranged outside two strips of the stitch 13 and the stitch 14 is provided in the seam allowance 15. An edge portion 22 arranged outside two strips of the stitch 13 and the stitch 14 is also provided in the seam allowance 16.

The hook-and-loop fastener 18 is fixed in the edge portion 21 of the seam allowance 15 and the edge portion 22 of the seam allowance 16. The sewing may be exemplified as a method of fixing the hook-and-loop fastener 18 to the edge portion 21 and the edge portion 22.

Since the edge portion 21 of the seam allowance 15 is arranged outside two strips of the stitch 13 and the stitch 14, the edge portion 21 can be separated from the skin material 10 by bending back the edge portion 21. Since the edge portion 22 of the seam allowance 16 is also arranged outside two strips of the stitch 13 and the stitch 14, the edge portion 22 can be separated from the skin material 11 by bending back the edge portion 22.

When the edge portion 21 of the seam allowance 15 is bent back, a seam 23 which sews the hook-and-loop fastener 18 in the edge portion 21 does not reach the skin material 10, and the seam 23 can be formed only in the edge portion 21. When the edge portion 22 of the seam allowance 16 is bent back, a seam 24 which sews the hook-and-loop fastener 18 in the edge portion 22 of the seam allowance 16 does not reach the skin material 11, and the seam 24 is formed in the edge portion 22.

When the seam 23 is formed only in the edge portion 21 of the seam allowance 15, the seam 23 is covered with the skin material 10 to be hidden without appearing in the appearance of the vehicle seat 1. Similarly, when the seam 24 is formed only in the edge portion 22 of the seam allowance 16, the seam 24 is covered with the skin material 11 to be hidden without appearing in the appearance of the vehicle seat 1.

Next, with reference to FIGS. 5 to 9, the manufacturing method of the seat cover 5 will be described by giving the forming of the stitch 13 and the stitch 14 and the fixing of the hook-and-loop fastener 18 to the welt seam part 17 as examples.

Figure 5:
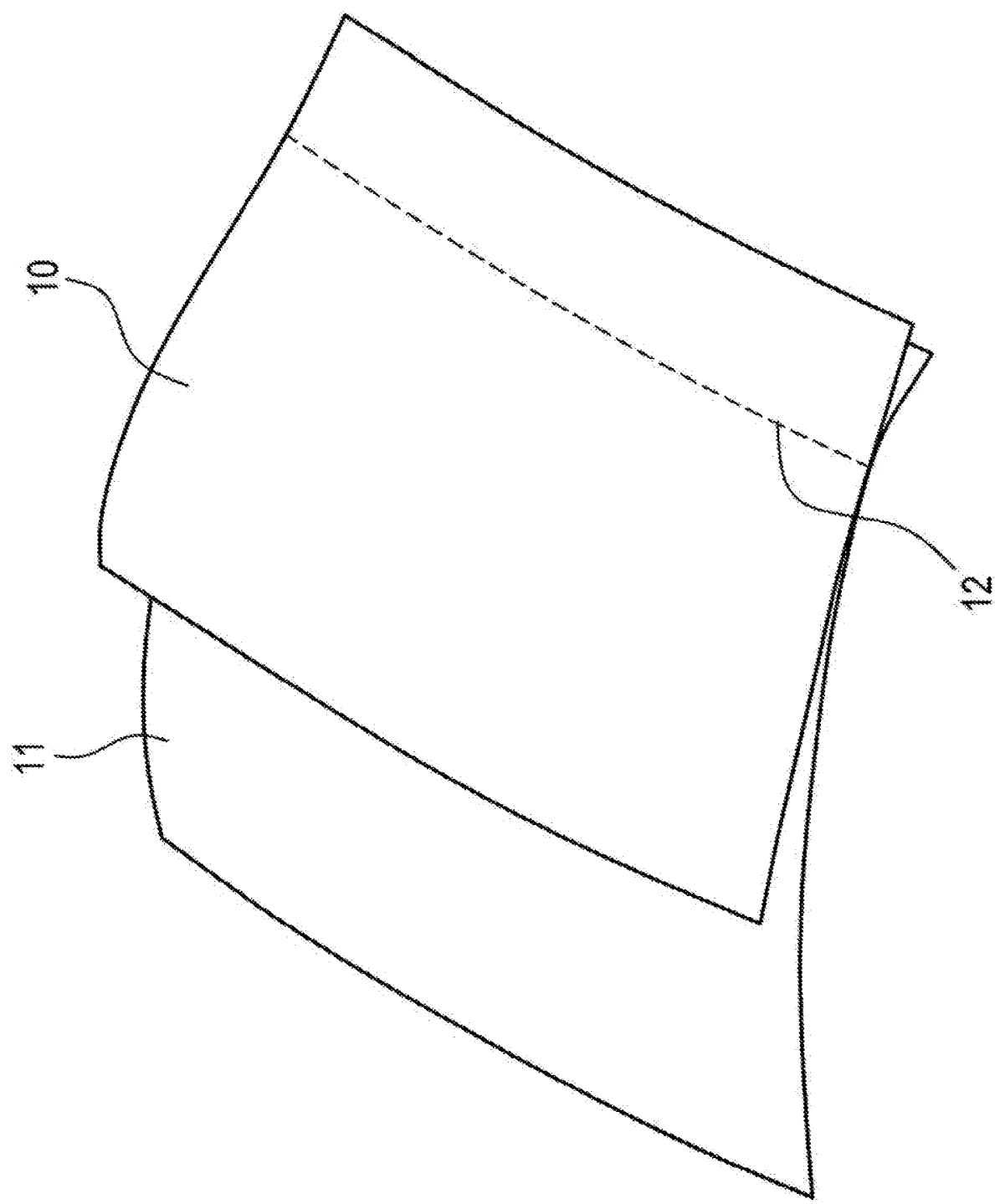
FIG. 5 is a schematic view for describing a sewing process of the seat cover of FIG. 1.

First, as illustrated in FIG. 5, the terminal part of the skin material 10 and the terminal part of the skin material 11 are sewn in an overlapped state. At that time, for example, the edge of the terminal part of the skin material 10 positioned on the upper side among the overlapped skin material 10 and skin material 11 is used as a guide, and the terminal part of the skin material 10 and the terminal part of the skin material 11 are sewn along the edge of the terminal part.

Figure 6:
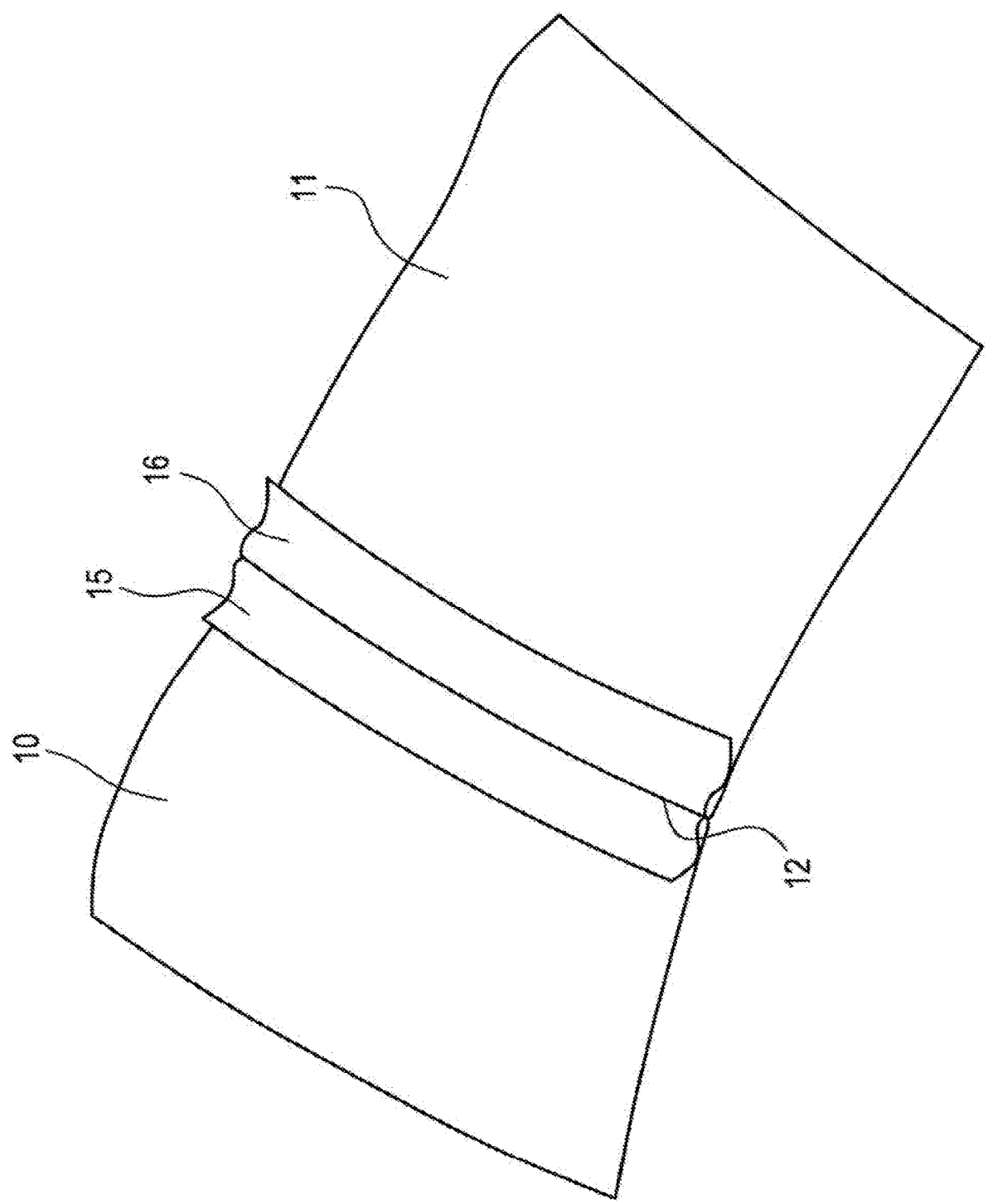
FIG. 6 is a schematic view for describing the sewing process of the seat cover of FIG. 1.

Next, as illustrated in FIG. 6, the seam allowance 15 of the skin material 10 and the seam allowance 16 of the skin material 11 are split to right and left sides with the seam 12 sewing the skin material 10 and the skin material 11 as a boundary. The seam allowance 15 is folded on the skin material 10, and the seam allowance 16 is folded on the skin material 11.

Figure 7:
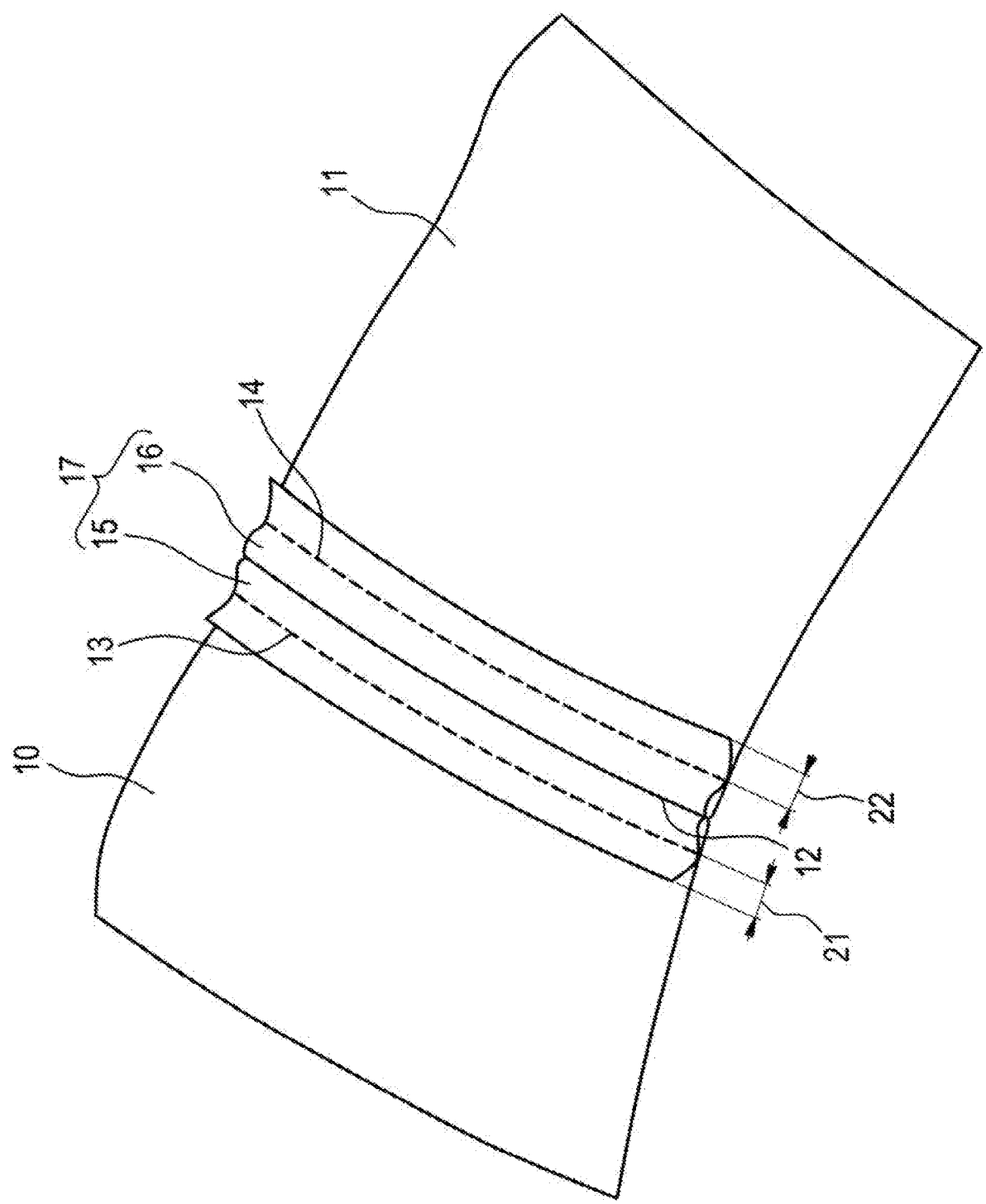
FIG. 7 is a schematic view for describing the sewing process of the seat cover of FIG. 1.

Next, as illustrated in FIG. 7, along the seam 12, the stitch 13 is formed in the skin material 10, and the stitch 14 is formed in the skin material 11. The seam allowance 15 folded on the skin material 10 is sewn on the skin material 10 by the stitch 13, and the seam allowance 16 folded on the skin material 11 is sewn on the skin material 11 by the stitch 14, whereby the welt seam part 17 is formed. The edge portion 21 arranged outside two strips of the stitch 13 and the stitch 14 remains in the seam allowance 15, and the edge portion 22 arranged outside two strips of the stitch 13 and the stitch 14 remains in the seam allowance 16.

Figure 8:
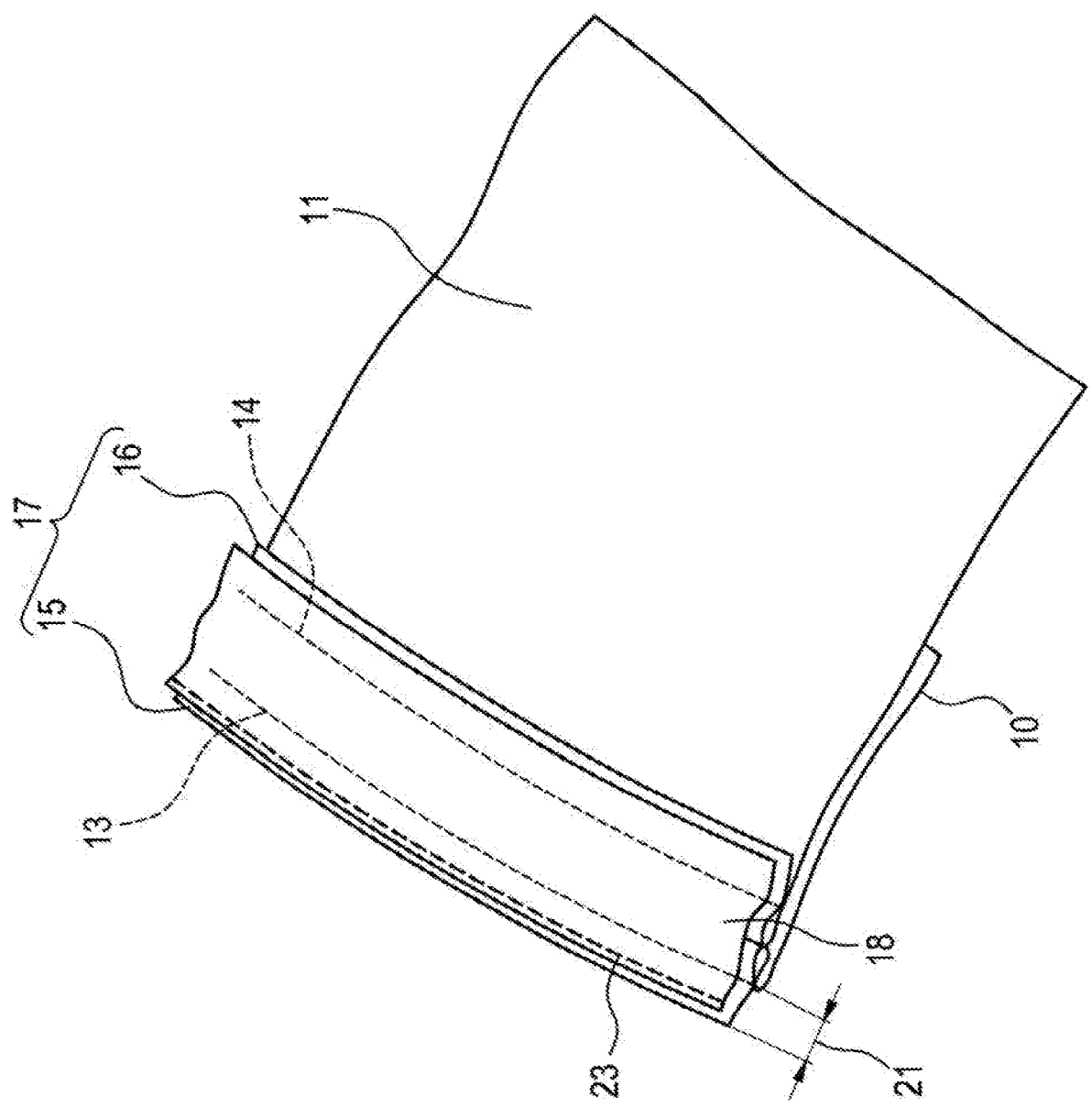
FIG. 8 is a schematic view for describing the sewing process of the seat cover of FIG. 1.

Next, as illustrated in FIG. 8, the skin material 10 is folded back to the skin material 11 side with the stitch 13 as a folding line, and the edge portion 21 of the seam allowance 15 of the skin material 10 is bent back. Further, the hook-and-loop fastener 18 is overlapped with the welt seam part 17, and the hook-and-loop fastener 18 is sewn on the edge portion 21 of the seam allowance 15 separated from the skin material 10.

Figure 9:
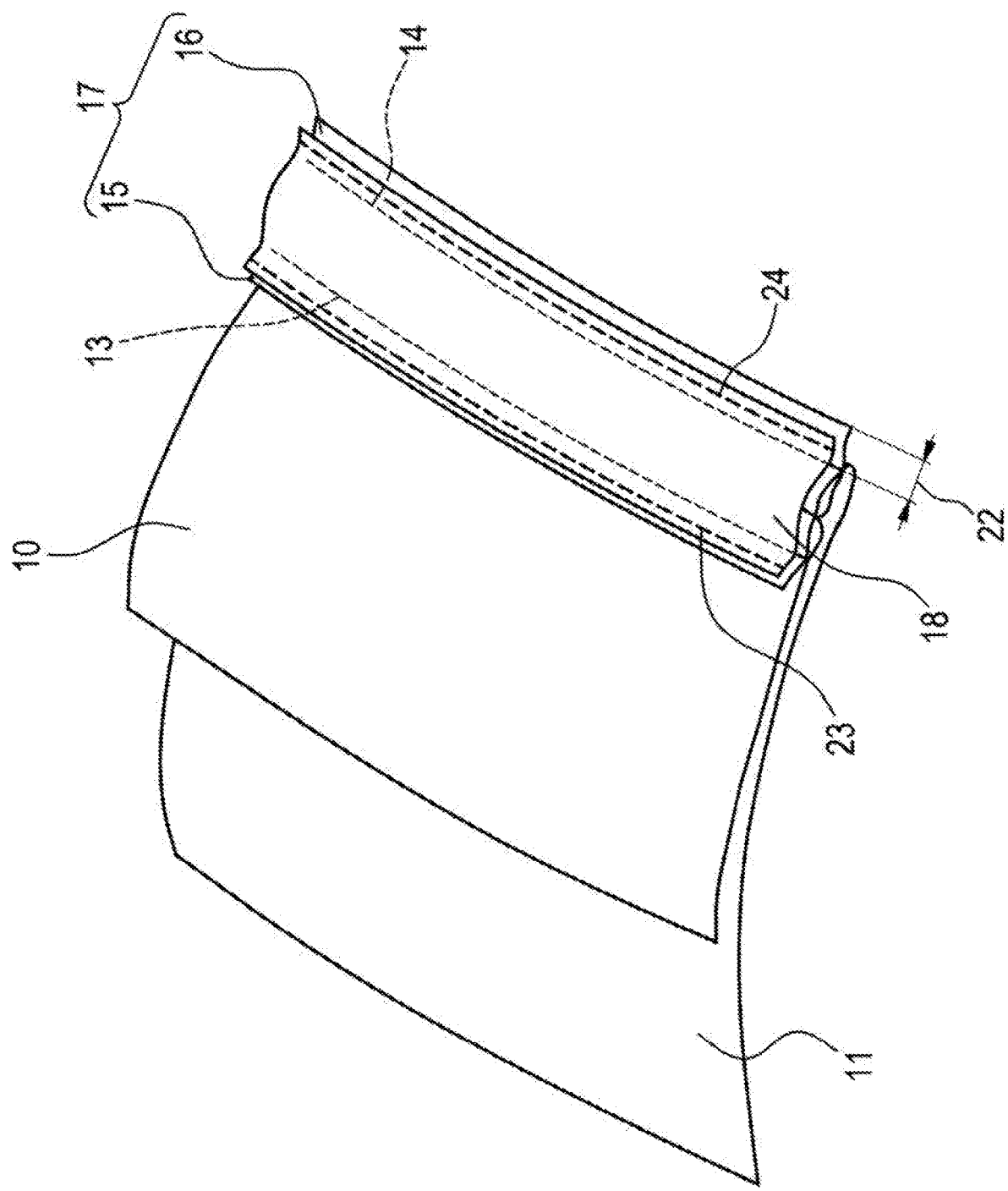
FIG. 9 is a schematic view for describing the sewing process of the seat cover of FIG. 1.

Finally, as illustrated in FIG. 9, the skin material 11 is folded back to the skin material 10 side with the stitch 14 as a folding line, and the edge portion 22 of the seam allowance 16 of the skin material 11 is bent back. Further, the hook-and-loop fastener 18 is sewn on the edge portion 22 of the seam allowance 16 separated from the skin material 11.

According to the above sewing process, the forming of the stitch 13 and the stitch 14 and the fixing of the hook-and-loop fastener 18 to the welt seam part 17 are performed as separate processes. Therefore, when the stitch 13 and the stitch 14 are formed, it is only necessary to press the seam allowance 15 of the skin material 10 and the seam allowance 16 of the skin material 11, and it is unnecessary to press the hook-and-loop fastener 18. When the hook-and-loop fastener 18 is fixed in the welt seam part 17, it is only necessary to press the hook-and-loop fastener 18, and it is unnecessary to press the seam allowance 15 and the seam allowance 16.

Since it is unnecessary to press the hook-and-loop fastener 18 at the time of forming the stitch 13 and the stitch 14, a workload is reduced, the seam allowance 15 and the seam allowance 16 can be pressed more accurately, and the forming of the stitch 13 and the stitch 14 is facilitated.

Accordingly, it is suppressed that shrinkage or a wrinkle occurs in the skin material 10 and the skin material 11, thereby improving an appearance quality of the vehicle seat 1 covered with the seat cover 5. In a case where the seam 12 sewing the skin material 10 and the skin material 11 is formed in a curved shape, the shrinkage or the wrinkle easily occurs in the seam allowance 15 folded on the skin material 10 and the seam allowance 16 folded on the skin material 11. The invention is particularly effective in this case.

Since the forming of the stitch 13 and the stitch 14 is facilitated, the stitch 13 and the stitch 14 can be formed at once without stopping on the way, and the disorder of the stitch 13 and the stitch 14 is suppressed so as to improve the appearance quality of the vehicle seat 1 covered with the seat cover 5.

Since it is unnecessary to press the seam allowance 15 and the seam allowance 16 at the time of fixing the hook-and-loop fastener 18 in the welt seam part 17, the workload is reduced, the hook-and-loop fastener 18 can be pressed more accurately, and the fixing of the hook-and-loop fastener 18 to the welt seam part 17 is facilitated.

Hereinbefore, the description has been given about a case Where the hook-and-loop fastener 18 is provided over the entire length of the welt seam part 17. However, the hook-and-loop fastener 18 may be provided in each of one or more partial sections among the partial sections in the longitudinal direction of the welt seam part 17.

Figure 10:
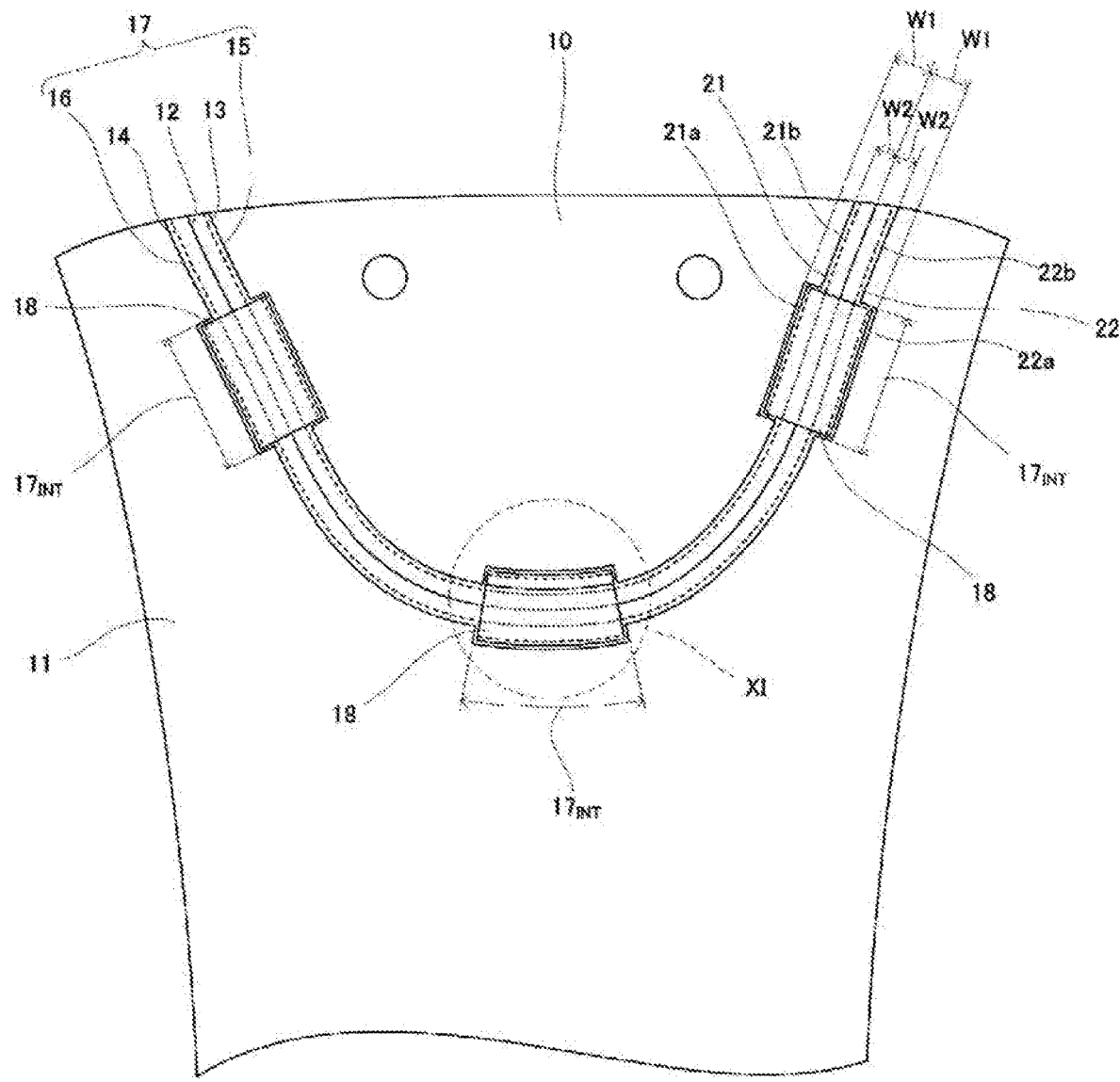
FIG. 10 is an enlarged view illustrating a back surface side of a modification of the seat cover of FIG. 1.

In a modification of the seat cover 5 illustrated in FIG. 10, the hook-and-loop fastener 18 is provided in each of three partial sections $17_{INT}$ which are provided with an interval interposed therebetween in the longitudinal direction of the welt seam part 17.

A seam allowance width W1, in the partial section $17_{INT}$, of the seam allowance 15 of the skin material 10 and the seam allowance 16 of the skin material 11 forming the welt seam part 17 is larger than the seam allowance width W2 in a remaining section excluding the partial section $17_{INT}$. Therefore, the edge 21a, in the partial section $17_{INT}$, of the edge portion 21 of the seam allowance 15 on which the hook-and-loop fastener 18 is sewn protrudes outside two strips of the stitch 13 and the stitch 14 from an edge 21b in the remaining section. Similarly, the edge 22a, in the partial section $17_{INT}$, of the edge portion 22 of the seam allowance 16 on which the hook-and-loop fastener 18 is sewn also protrudes outside two strips of the stitch 13 and the stitch 14 from an edge 22b in the remaining section.

Figure 11:
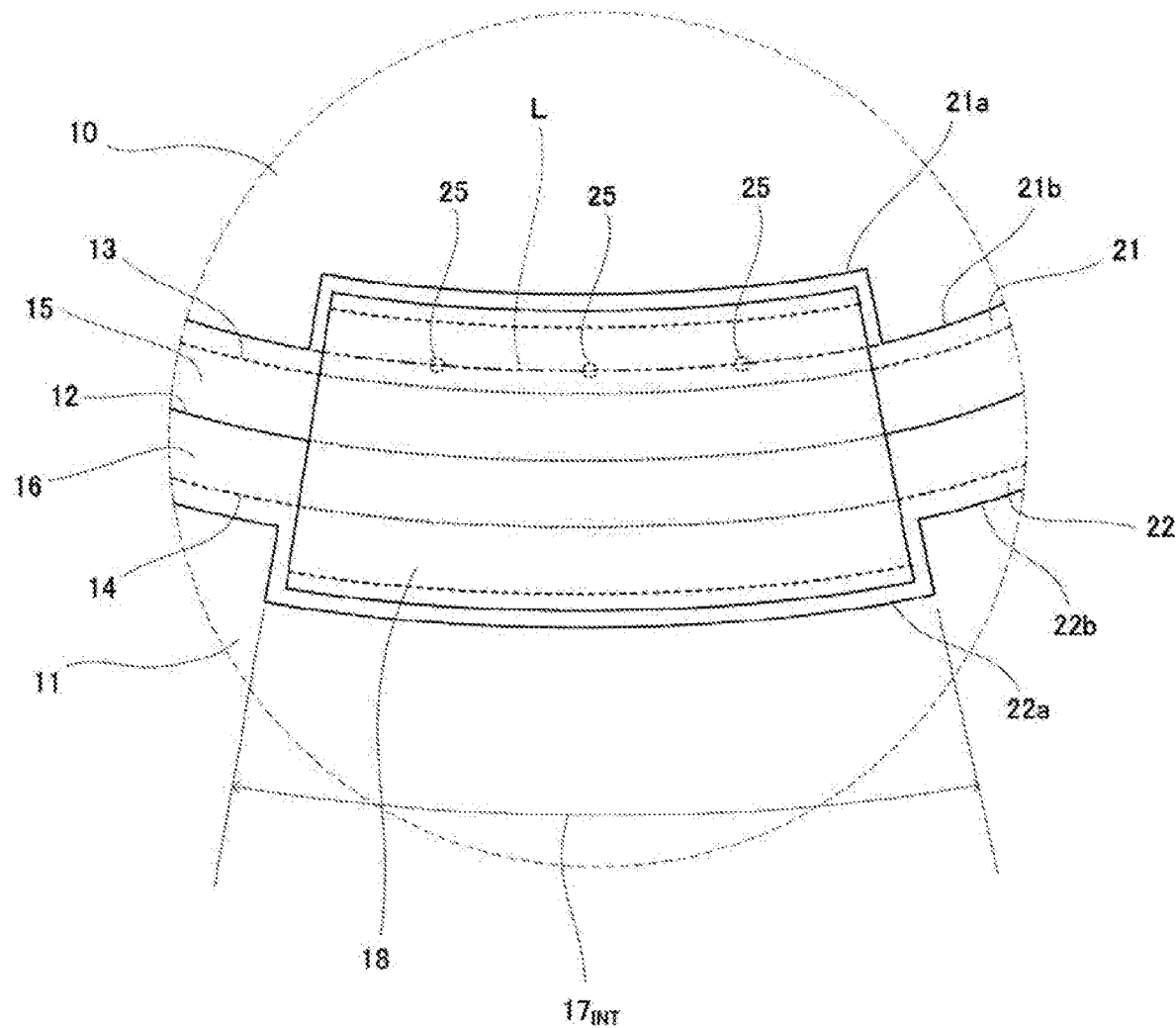
FIG. 11 is an enlarged view illustrating a portion, which is surrounded by a dashed-line circle XI, of the vehicle seat of FIG. 10.

As illustrated in FIG. 11, the edge portion 21, in the partial section $17_{INT}$, of the seam allowance 15 of the skin material 10 is formed with a plurality of holes 25 which serve as guides at the time of sewing the skin material 10 and the skin material 11. The holes 25 are provided with a proper the interval interposed therebetween on an extended line L in which the edge 21b of the edge portion 21 in the remaining section extends along the seam 12 sewing the skin material 10 and the skin material 11.

Incidentally, a line or a mark which is drawn in the skin material through a printing or the like may be used as the guide. However, as illustrated as an example, the hole formed in the skin material may be used preferably. In a case where an original fabric is punched to form the skin material, the holes can be formed together at the time of punching. In addition, in a case where the original fabric is cut to form the skin material, plural sheets of skin materials are overlapped, and the holes can be formed in a lump in the skin materials.

Next, the manufacturing method of the seat cover illustrated in FIG. 10 will be described with reference to FIGS. 12 and 13.

Figure 12:
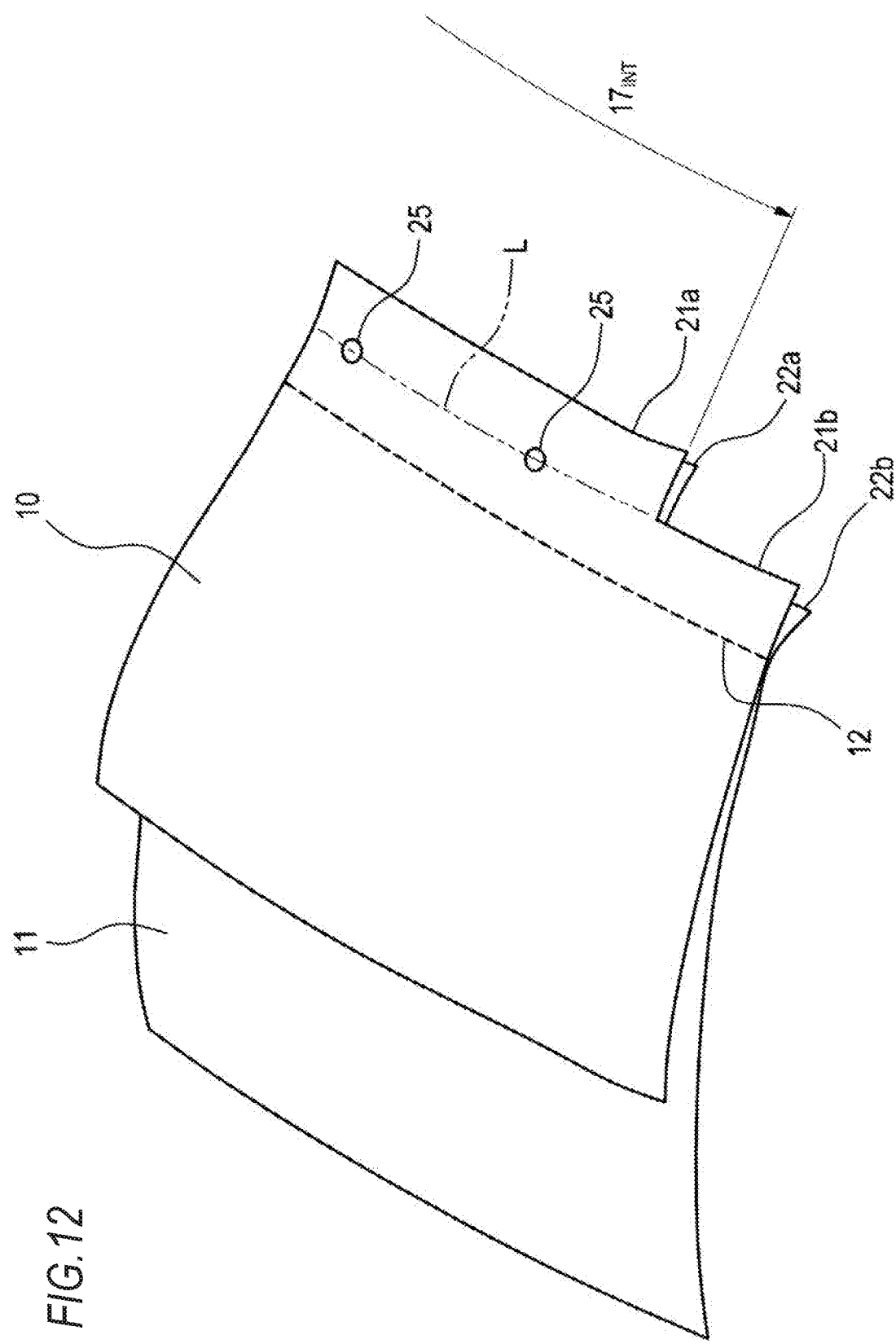
FIG. 12 is a schematic view for describing a sewing process of the seat cover of FIG. 10.

First, as illustrated in FIG. 12, the skin material 10 formed with the plurality of holes 25 as a guide is arranged above, and the terminal part of the skin material 10 and the terminal part of the skin material 11 are overlapped to be sewn. In this example, in the terminal part of the skin material 10 positioned above, the edge 21a in the portion which will form the partial section $17_{INT}$ of the welt seam part 17 later protrudes from the edge 21b in the portion which forms the remaining section of the welt seam part 17. Substantially continuous guides which extend over the entire length of the terminal part is formed in the edge 21b of the portion forming the remaining section and the plurality of holes 25 formed on the extended line L of the edge 21b. When the terminal part of the skin material 10 and the terminal part of the skin material 11 are sewn along the guides, it is possible to suppress the disorder, such as meander, of the seam 12 which sews the skin material 10 and the skin material 11.

Next, the seam allowance 15 of the skin material 10 and the seam allowance 16 of the skin material 11 are split to right and left sides with the seam 12 sewing the skin material 10 and the skin material 11 as a boundary. The seam allowance 15 is folded on the skin material 10, and the seam allowance 16 is folded on the skin material 11. Further, along the seam 12, the stitch 13 is formed in the skin material 10, and the stitch 14 is formed in the skin material 11. The seam allowance 15 is sewn on the skin material 10 by the stitch 13, and the seam allowance 16 folded on the skin material 11 is sewn on the skin material 11 by the stitch 14, so as to form the welt seam part 17 (see FIGS. 6 and 7).

Figure 13:
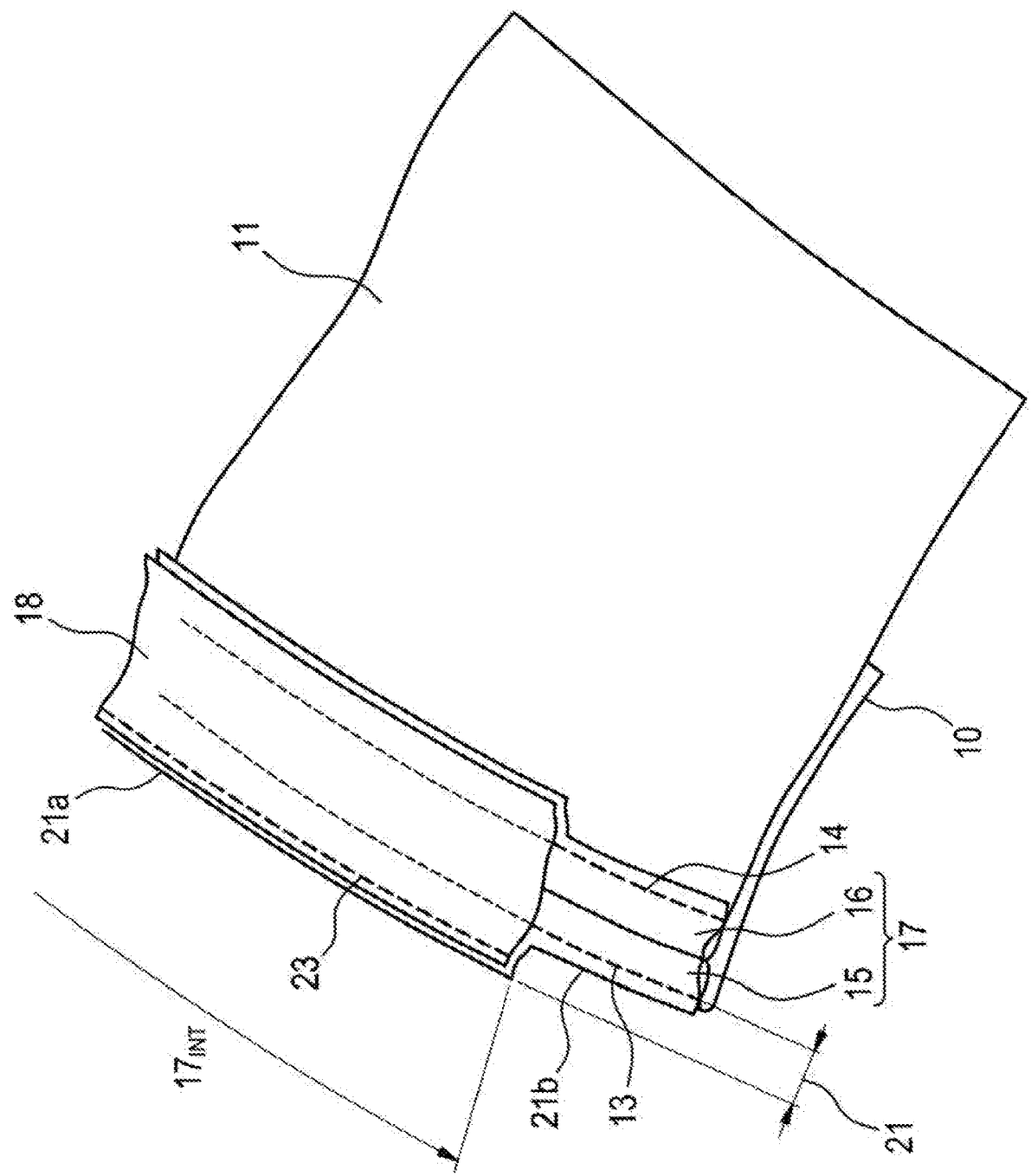
FIG. 13 is a schematic view for describing the sewing process of the seat cover of FIG. 10.

Next, as illustrated in FIG. 13, the skin material 10 is folded back to the skin material 11 side with the stitch 13 as a folding line, and the edge portion 21 of the seam allowance 15 of the skin material 10 is bent back. Further, the hook-and-loop fastener 18 is overlapped with the partial section $17_{INT}$ of the welt seam part 17, and the hook-and-loop fastener 18 is sewn on the edge portion 21 of the seam allowance 15 separated from the skin material 10.

Finally, the skin material 11 is folded back to the skin material 10 side with the stitch 14 as a folding line, and the edge portion 22 of the seam allowance 16 of the skin material 11 is bent back. Further, the hook-and-loop fastener 18 is sewn on the edge portion 22 of the seam allowance 16 separated from the skin material 11.

Herein, in a case where the seam 12 sewing the skin material 10 and the skin material 11 is formed in a curved shape, as described above, the shrinkage or the wrinkle easily occurs in the seam allowance 15 of the skin material 10 and the seam allowance 16 of the skin material 11, and the shrinkage or the wrinkle is promoted to enlarge the seam allowance width of the seam allowance 15 and the seam allowance 16. On the other hand, the corresponding seam allowance required to sew the hook-and-loop fastener 18 is necessary in the edge portion 21 of the seam allowance 15 and the edge portion 22 of the seam allowance 16.

In this example, the seam allowance width W1, in the partial section $17_{INT}$, of the seam allowance 15 of the skin material 10 and the seam allowance 16 of the skin material 11 is larger than the seam allowance width W2 in the remaining section. In the partial section $17_{INT}$ provided with the hook-and-loop fastener 18, the sufficient seam allowance required to sew the hook-and-loop fastener 18 is partially secured in the edge portion 21 and the edge portion 22. Accordingly, it is possible to suppress the shrinkage or the wrinkle of the seam allowance 15 and the seam allowance 16 and to facilitate the fixing of the hook-and-loop fastener 18.

When the seam allowance width W1, in the partial section $17_{INT}$ of the seam allowance 15 of the skin material 10 and the seam allowance 16 of the skin material 11 is relatively large, it is possible to clearly indicate the provided position of the hook-and-loop fastener 18 partially provided in the welt seam part 17.

INDUSTRIAL APPLICABILITY

The invention is not limited to the seat mounted in the vehicle such as an automobile and also may be applied to a seat cover of another seat such as an office chair.

DESCRIPTION OF REFERENCE NUMERALS AND SIGNS

1: vehicle seat
2: seat cushion
3: seat back
4: headrest
5: seat cover
10: skin material
11: skin material
12: seam
13: stitch
14: stitch
15: seam allowance
16: seam allowance
17: welt seam part
$17_{INT}$: partial section
18: hook-and-loop fastener
19: hook-and-loop fastener
20: cushion pad
21: edge portion
21a: edge
21b: edge
22: edge portion
22a: edge
22b: edge
23: seam
24: seam
25: hole (guide)
L: extended line
W1: seam allowance width
W2: seam allowance width

The invention claimed is:

1. A seat cover which is formed by sewing a plurality of skin materials, the seat cover comprising:
a welt seam part in which seam allowances of two sheets of sewn skin materials are split to right and left sides to be folded on the two sheets of respective skin materials, and the seam allowances are sewn on the two sheets of respective skin materials by two strips of stitches respectively formed in the two sheets of skin materials along a seam where the two sheets of skin materials are sewn; and
a hook-and-loop fastener provided in the welt seam part, wherein:
the seam allowances of the two sheets of skin materials include edge portions arranged outside the two strips of stitches;
the hook-and-loop fastener is fixed in the edge portions;
the hook-and-loop fastener is provided in each of one or more partial sections among partial sections in a longitudinal direction of the welt seam part; and
a seam allowance width, in the partial section, of the seam allowances of the two sheets of skin materials is larger than a seam allowance width in a remaining section excluding the partial section.

2. The seat cover according to claim 1, wherein
a guide which is positioned on an extended line in which an edge of the edge portion in the remaining section extends along the seam is formed in the edge portion in the partial section of the seam allowance of the skin material of at least one of the two sheets of skin materials.

3. The seat cover according to claim 1, wherein
the seam is formed in a curved shape.

4. A manufacturing method of a seat cover which is formed by sewing a plurality of skin materials, the method comprising:
splitting seam allowances of two sheets of sewn skin materials to right and left sides to be folded on two sheets of respective skin materials;
forming stitches in the two sheets of respective skin materials along a seam where the two sheets of skin materials are sewn so as to sew the seam allowances of the two sheets of skin materials on the two sheets of respective skin materials by two strips of the stitches formed in the two sheets of respective skin materials, thereby forming a welt seam part; and
overlapping a hook-and-loop fastener with the welt seam part and fixing the hook-and-loop fastener to edge portions which are arranged outside the two strips of stitches in the seam allowances of the two sheets of skin materials, wherein:
the hook-and-loop fastener is overlapped in each of one or more partial sections among partial sections in a longitudinal direction of the welt seam part, and the hook-and-loop fastener is fixed to the edge portions of the seam allowances of the two sheets of skin materials in each of the partial sections; and
a seam allowance width, in the partial section, of the seam allowances of the two sheets of skin materials is larger than a seam allowance width in a remaining section excluding the partial section.

5. The manufacturing method of the seat cover according to claim 4, wherein:
a guide which is positioned on an extended line in which an edge of the edge portion in the remaining section extends along the seam is formed in the edge portion, in the partial section, of the seam allowance of the skin material of at least one of the two sheets of skin materials; and
the two sheets of skin materials are sewn along the guide and the edge of the edge portion in the remaining section.

6. A vehicle seat comprising:
a seat cover, which is formed by sewing a plurality of skin materials, including:
a welt seam part in which seam allowances of two sheets of sewn skin materials are split to right and left sides to be folded on the two sheets of respective skin materials, and the seam allowances are sewn on the two sheets of respective skin materials by two strips of stitches respectively formed in the two sheets of skin materials along a seam where the two sheets of skin materials are sewn; and
a first hook-and-loop fastener provided in the welt seam part; and
a cushion pad covered with the seat cover, wherein:
the seam allowances of the two sheets of skin materials include edge portions arranged outside the two strips of stitches;
the first hook-and-loop fastener is fixed in the edge portions;
a second hook-and-loop fastener is provided in the cushion pad;
the first hook-and-loop fastener and the second hook-and-loop fastener are coupled with each other,
the first hook-and-loop fastener is provided in each of one or more partial sections among partial sections in a longitudinal direction of the welt seam part; and
a seam allowance width, in the partial section, of the seam allowances of the two sheets of skin materials is larger than a seam allowance width in a remaining section excluding the partial section.

* * * * *